United States Patent [19]

Picard et al.

[11] Patent Number: 5,699,393
[45] Date of Patent: Dec. 16, 1997

[54] FUEL ASSEMBLY LOADING INSTALLATION

[75] Inventors: Paul Picard, Parnans; Roland Villeays, Romans, both of France

[73] Assignee: Societe Franco-Belge de Fabrication de Combustibles FBFC, Courbevoie, France

[21] Appl. No.: 596,194
[22] PCT Filed: Aug. 18, 1994
[86] PCT No.: PCT/FR94/01013
  § 371 Date: Jul. 22, 1996
  § 102(e) Date: Jul. 22, 1996
[87] PCT Pub. No.: WO95/06318
  PCT Pub. Date: Mar. 2, 1995

[30] Foreign Application Priority Data

Aug. 20, 1993 [FR] France .................. 93 10159

[51] Int. Cl.⁶ .................................. G21C 3/334
[52] U.S. Cl. .................................. 376/261
[58] Field of Search .................. 376/260, 261; 29/723, 906

[56] References Cited

U.S. PATENT DOCUMENTS 4,297,776  11/1981  Fogg .................. 376/261
5,251,243  10/1993  Nylund et al. .................. 376/261

FOREIGN PATENT DOCUMENTS

0187268 A1  7/1986  European Pat. Off. .
0223200 A3  5/1987  European Pat. Off. .
0284814 A2  10/1988  European Pat. Off. .
0361794 A1  4/1990  European Pat. Off. .
2260848  4/1993  United Kingdom .

*Primary Examiner*—Daniel D. Wasil
*Attorney, Agent, or Firm*—Pollock, Vande Sande & Priddy

[57] ABSTRACT

The installation includes at least one loading line comprising a framework support, a magazine for storing fuel rods and a traction bench in an arrangement aligned along the longitudinal direction of the housings of the framework of the assembly. The traction bench includes a support having a fixed part and a movable part to be positioned in the loading line in longitudinal alignment with the framework support and the storage magazine, a carriage mounted for movement on the support in the longitudinal direction, a plurality of rod grippers, linkage between the grippers and the carriage, an arrangement selectively controlling displacement or retention of the grippers, a selection unit for selective activation of a subset of grippers and controls for gripping the grippers.

16 Claims, 13 Drawing Sheets

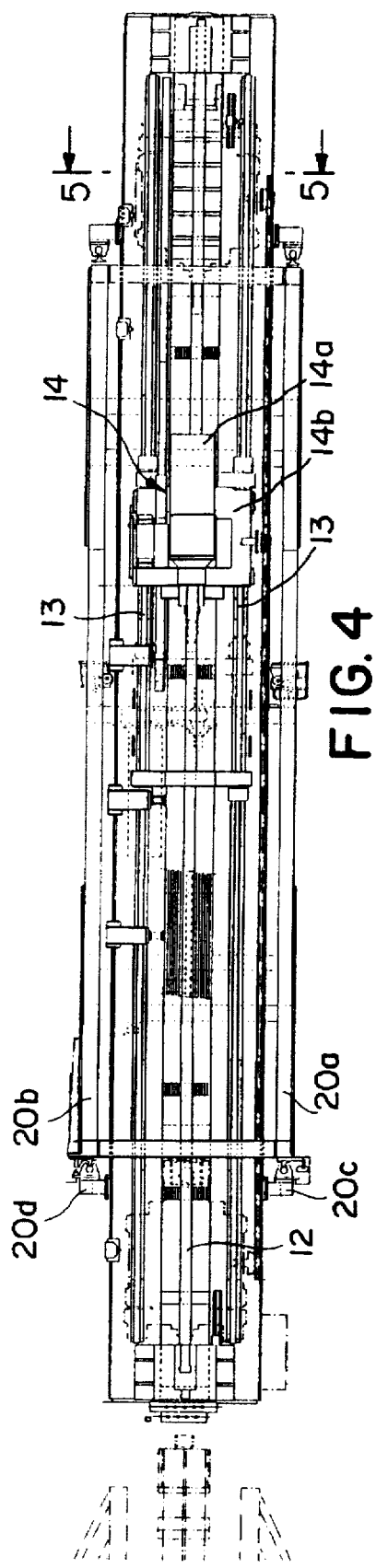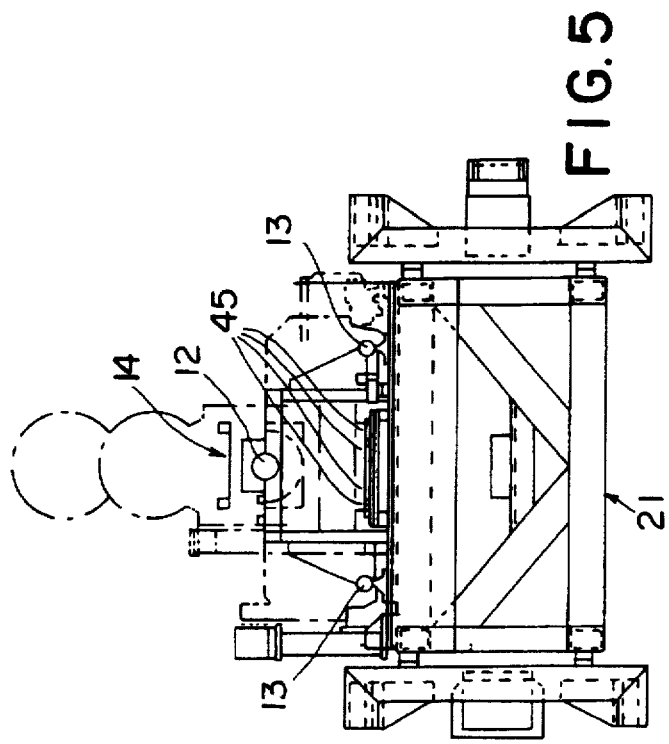

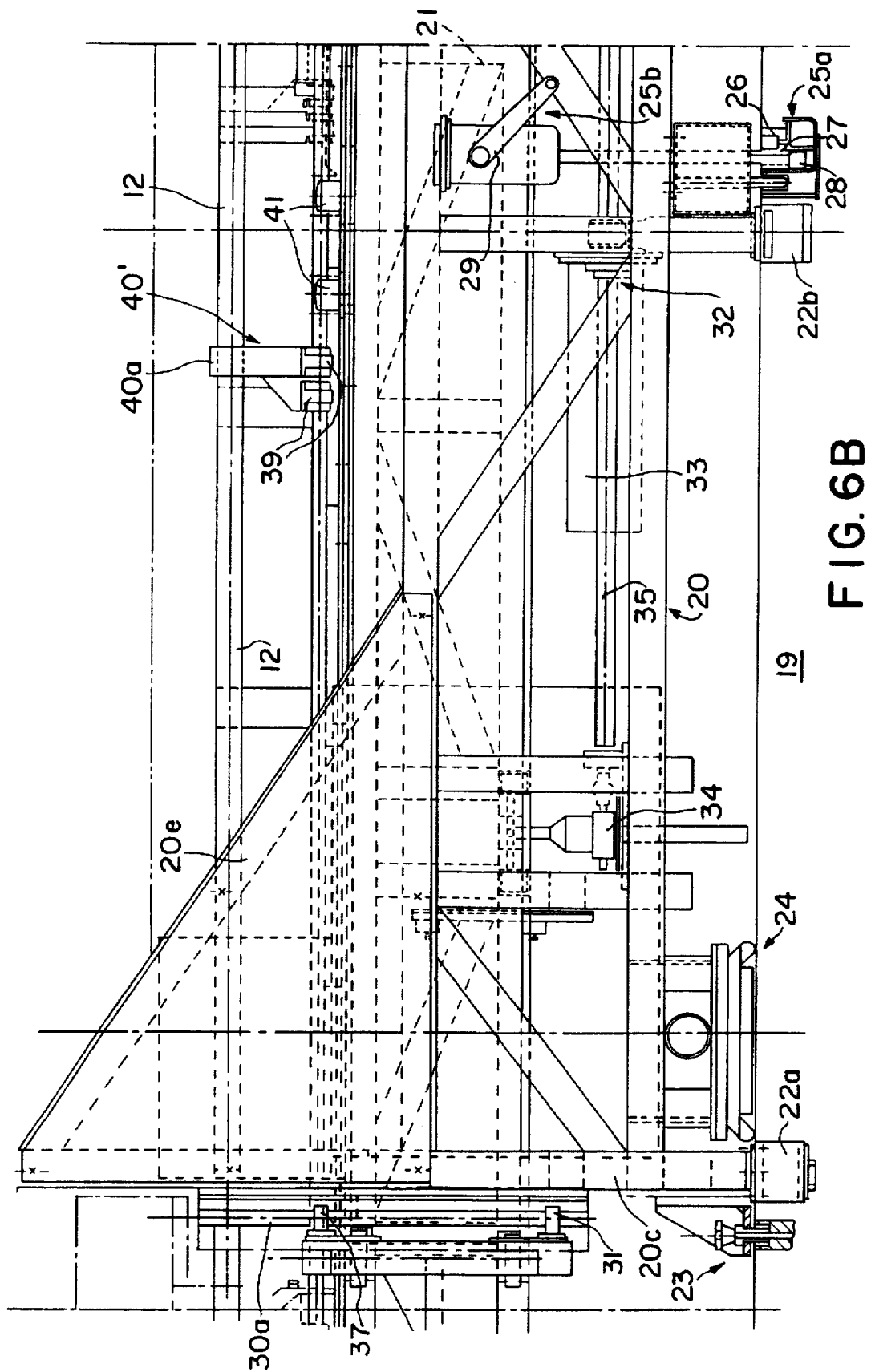

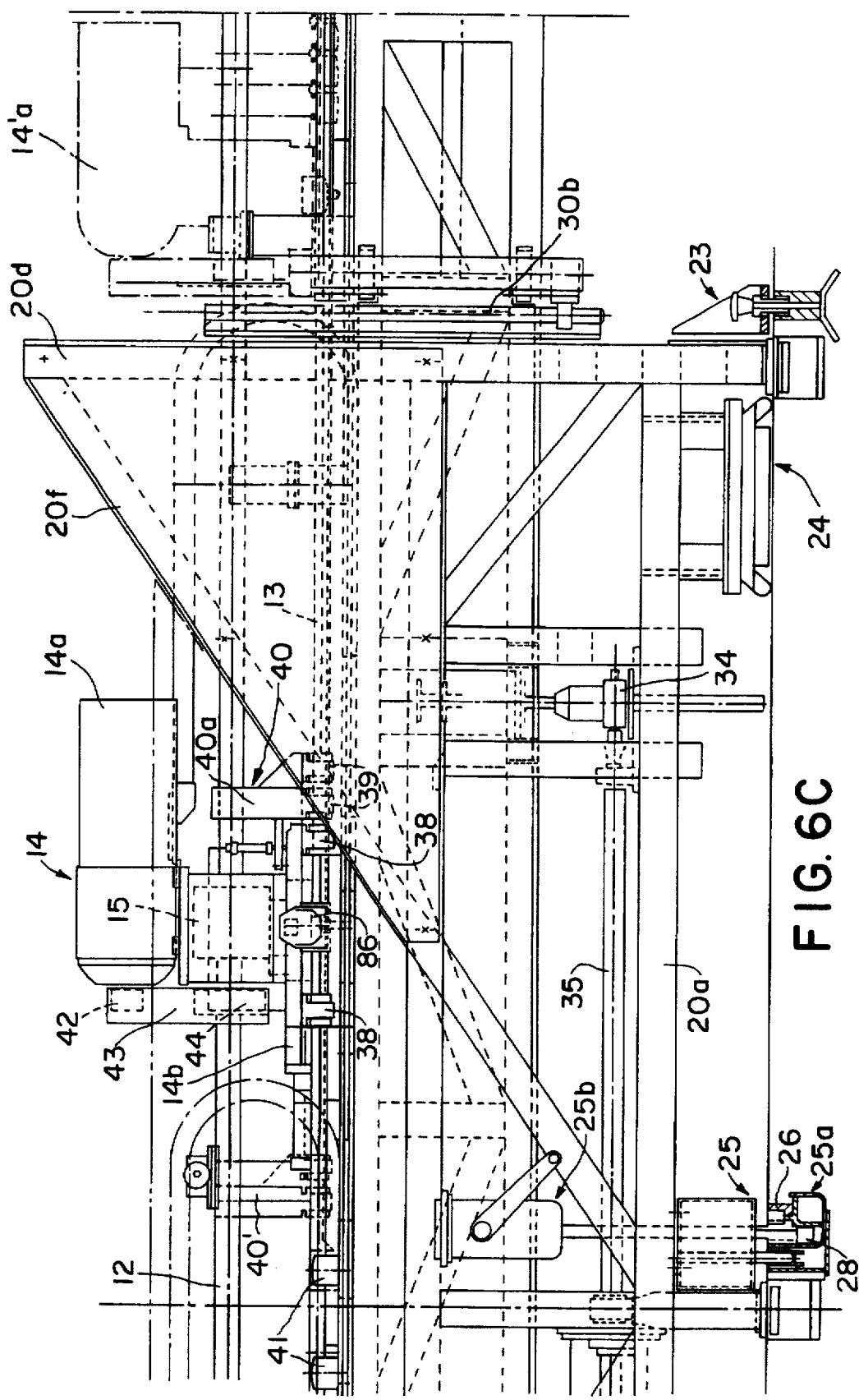

FUEL ASSEMBLY LOADING INSTALLATION

FIELD OF THE INVENTION

The invention relates to a fuel assembly loading installation and, in particular, a fuel assembly loading installation for a pressurized water nuclear reactor.

BACKGROUND OF THE INVENTION

Pressurized water nuclear reactors include a core consisting of fuel assemblies of generally prismatic shape and having a length which is significant relative to their transverse dimension, e.g., of the order of four or more meters for assemblies having a square cross-section with sides of about 0.20 meters.

The fuel assemblies of pressurized water nuclear reactors consist of a framework forming housings for a set of fuel rods in parallel arrangements along the longitudinal direction of the assembly. The fuel rods are only very slightly shorter than the fuel assemblies, and their diameter is generally less than 1 cm.

The framework of the fuel assembly includes spacer grids perpendicular to the longitudinal direction of the assembly. These allow the fuel rods to be held in a regular array in the transverse planes of the assembly.

The spacer grids are spaced regularly along the longitudinal direction of the assembly and are fixed on guide tubes which substitute for certain fuel rods of the array of the assembly.

The spacer grids include cells in which fuel rods are held transversely by bosses and by springs placed opposite each other.

The framework of the fuel assembly is closed at its ends by two nozzles, one of which constitutes the bottom nozzle of the assembly, intended to rest on the lower support plate of the core and the other a top nozzle on which the upper plate of the core of the reactor comes to bear, after loading of the fuel assemblies.

The manufacture and mounting of the frameworks of the fuel assemblies, followed by the loading of the frameworks with fuel rods, is carried out in the factory. The fuel rods are to be introduced into the framework via one of the ends of the assembly which does not include its closure nozzle.

The fuel material of the assemblies which produces the neutron reactions in the nuclear reactor in operation is progressively consumed, so that it is necessary periodically to refuel the core of the reactor by replacing spent assemblies with new assemblies.

The fuel rods for loading the assemblies are to be introduced into their housings via one of the ends of the assembly and slid into the housings defined by the aligned cells of the spacer grids.

It has been proposed to carry out these loading operations by introducing the fuel rods one by manually one into their housings.

This manual operation is characterized by extremely long manufacturing times of the fuel assemblies, because of the large number of rods to a fuel assembly.

The fuel assemblies most commonly used in pressurized water nuclear reactors actually constitute arrays of rods with square unit cells which may, for example, include fourteen×fourteen or eighteen×eighteen cells intended to receive the fuel rods and the guide tubes fixed on the spacer grids. The fuel assemblies therefore generally include between two hundred and three hundred fuel rods which it is necessary to load into the framework.

In order to reduce the time for manufacture of the fuel assemblies, it may be advantageous to provide automatic installations for loading the fuel assemblies.

The new fuel rods which are loaded into the fuel assemblies are generally arranged in storage magazines including an array of housings which can be arranged in alignment with the housings of a fuel assembly framework to be filled with the new rods.

It has been proposed, for example, to carry out the loading by pushing the rods in order to slide them longitudinally, from a storage position inside the magazine to a position inside a housing of the framework defined by the spacer grids.

This operation can be carried out automatically under remote control but, because of the presence of guide tubes in certain positions of the array of housings of the assembly, it is necessary to provide a programming of the loading operations which takes into account the constitution of the array and the fact that the fuel rods are not to be introduced into the housings occupied by the guide tubes.

Furthermore, in certain types of fuel assemblies, the rods are not all identical as regards their nature and their enrichment in fissile material, and it is necessary to take account of the desirable distribution of the rods in the cross-section of the assembly during loading.

Furthermore, the introduction by thrusting of the fuel rods into the housings defined by the cells of the spacer grids which include bosses and springs projecting inwards may be accompanied by some degree of damage to the cladding of the rods which is in frictional contact with the bosses and springs.

It has been proposed to load the fuel assemblies by traction on an end of the rods which is closed by a plug, by using a traction device located in alignment with the rod storage magazine and the framework and including a traction rod whose diameter is slightly less than or equal to the diameter of a fuel rod. The long traction rod is introduced into the framework and includes gripping means at its end which are capable of providing linkage between the traction rod and a fuel rod, by means of the plug of this fuel rod, after passage of the entire length of the traction rod inside the framework.

Moving the traction rod in the direction opposite to the advance towards the magazine through the framework makes it possible to slide the fuel rod into a housing of the framework. The gripping means may be associated with devices allowing the springs and bosses to be moved apart during movement in the forward direction and during the introduction of the rod, so that the rod can be fitted with reduced friction and with limited wear on the cladding.

However, insofar as the rods are to be loaded rod by rod and in a programmed manner, the operations of loading the fuel assemblies are long and complex.

SUMMARY OF THE INVENTION

The object of the invention is to provide an installation for loading a fuel assembly consisting of a framework for making housings for a set of fuel rods in parallel arrangements and in an array and including guide tubes which substitute for certain rods in the array, which enables rapid loading of assemblies with fuel rods, without damaging the rods and while taking into account the position of the guide tubes in the array.

For this purpose, the loading installation according to the invention includes:

at least one loading line comprising a framework support and a magazine for storing fuel rods in an arrangement aligned along the longitudinal direction of the housings of the framework, and a loading unit comprising:
- a support to be positioned in the loading line, in longitudinal alignment with the framework support and the storage magazine,
- a carriage mounted for longitudinal movement on the support,
- a plurality of rod gripping means,
- means for linking the rod gripping means and the carriage,
- a plurality of means controlled selectively in order to interact with each of the rod gripping means in order to allow driving of the gripping means by the carriage or retention of the gripping means,
- a selection unit for selective activation of a subset of means interacting with the gripping means, and
- means for controlling the rod gripping means.

In order better to clarify the invention, a description will now be given, by way of example, and with reference to the attached figures, of one embodiment of a loading installation according to the invention.

FIG. 4 is a top plan view of the traction bench shown in FIG. 3.

FIG. 5 is a section view of a side part of the traction bench along 5—5 in FIG. 4.

FIGS. 6A, 6B and 6C are, respectively, views in elevation of the front part, of the mid-part and of the rear part of the traction bench shown in FIG. 3, FIGS. 7A, 7B and 7C are, respectively, plan views of the front part, of the mid-part and of the rear part of the traction bench shown in FIG. 4.

FIG. 11 is a front view of a clamp for gripping a tie rod for gripping a fuel rod.

DESCRIPTION OF THE PREFERRED EMBODIMENT

Figure 1:
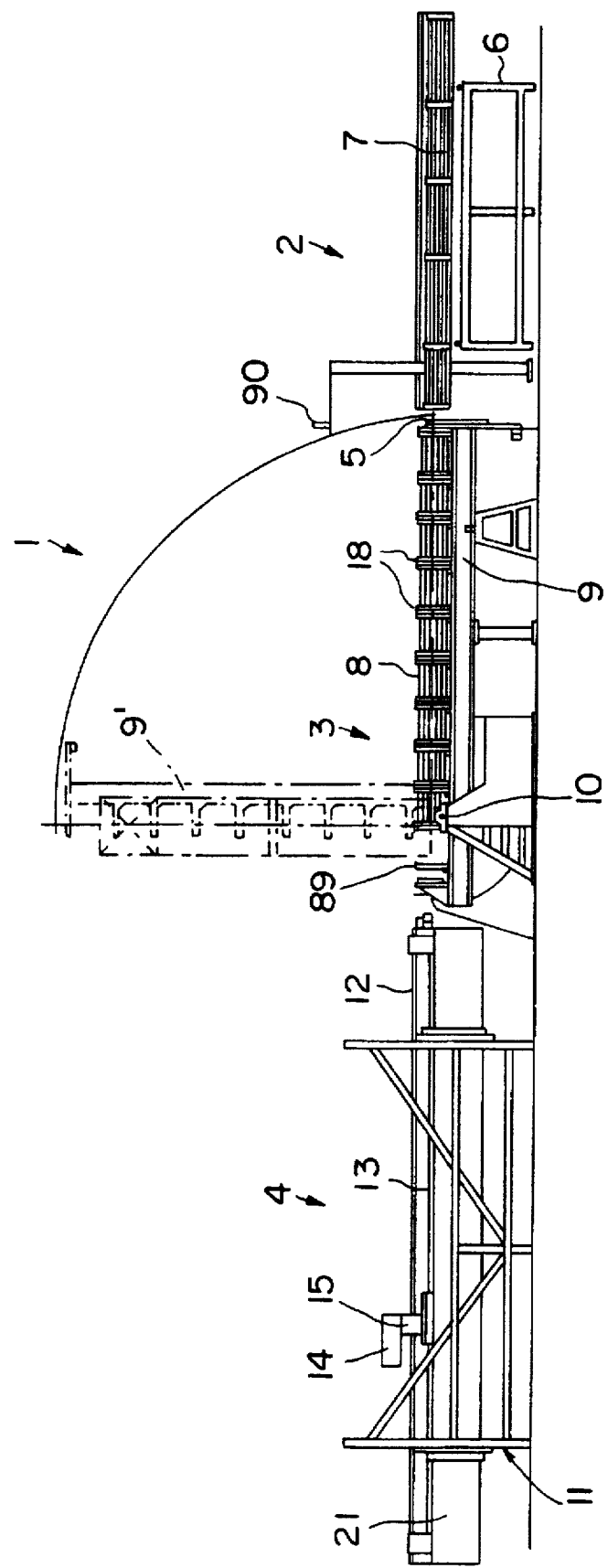
FIG. 1 is a schematic front elevation of a loading installation according to the invention during the loading of a fuel assembly framework.

FIG. 1 shows a line of a loading installation 1 according to the invention, including three successive units 2, 3 and 4 arranged in sequence along the longitudinal axis 5 of the loading line along which the fuel rods are moved by traction in order to introduce them into the housings of a framework of a fuel assembly.

The unit 2 consists of a support 6 on which rest a magazine 7 which contains new fuel rods placed freely in cells in arrangements parallel to the axis 5 of the loading line, in a manner similar to the fuel rods in an assembly framework.

The unit 3 is a bench for supporting a framework of a fuel assembly 8 which includes a part 9 for receiving and holding the framework of the fuel assembly 8 mounted for tilting movement about a horizontal spindle 10 between a horizontal position 9, shown in solid lines in FIG. 1, and a vertical position 9' shown in broken lines.

When the support 9 of the tilting bench 3 is in its horizontal position, the fuel assembly 8 is in loading position, in which the housings of the fuel rods, consisting of the aligned cells of the grids 18 of the assembly, are parallel to the axis 5 and arranged in extension of the new rods in the magazine 7 of the unit 2.

In the vertical position 9' of the support, the fuel assembly is placed in a vertical position allowing it to be gripped by handling means in order to remove the assembly after it has been loaded.

After removal of a loaded assembly, a new framework can be placed on the support 9' in the vertical position and then folded down into the horizontal position 9 in order to fill it with new fuel rods.

The unit 4 is a filling unit constructed in the form of a traction bench to be described in more detail with reference to FIGS. 3 and 4.

In general, the traction bench 4 includes a highly rigid support 11 arranged along axis 5 of the storage unit 2 of the fuel rods and of the tilting bench including the framework support 9; The framework support 9 of the tilting bench 3, intended to receive the framework of a fuel assembly 8, is interposed between the storage unit 2 including the magazine 7 and the traction bench 4.

A fixed screw 12 is arranged on a movable part 21 of the support 11 in an arrangement parallel to the axis 5 of the loading line, and a motorized carriage 14 is mounted for movement, by means of longitudinal guide means 13, on the movable support 21 in the direction of the loading axis 5.

The motor of the carriage 14 drives in rotation a nut 15 engaging with the screw 12 and moves the carriage 14 along the axial direction 5 of the loading line.

The carriage 14 moves, in the loading direction 5, devices for gripping and traction of fuel rods, which rods consist of long tie rods capable of being introduced by movement of the carriage 14 in a first direction, into the housings of the framework of the fuel assembly 8 carried by the framework support 9, over their entire length, so as to have an end including gripping clamps at the end of the magazine 7 which is opposite the end part of the tilting bench 3. It is thus possible to grip the fuel rods by the gripping means after moving the carriage 14 in a first direction.

In its second direction of movement, the carriage 14 makes it possible to introduce the fuel by traction rods into the framework of the fuel assembly 8.

Figure 2:
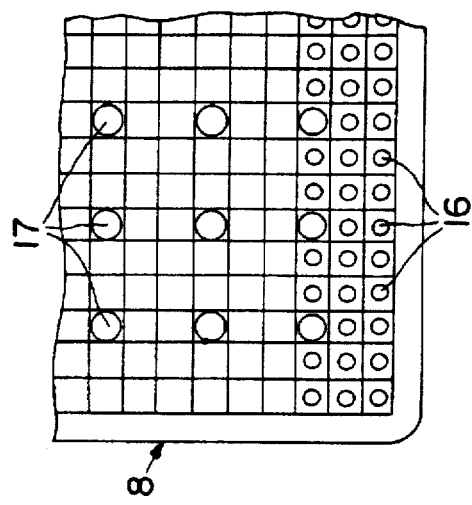
FIG. 2 is a view in partial cross-section of the framework during loading in the installation shown in FIG. 1.

As shown in FIG. 2, the framework of the fuel assembly 8 defines housings for fuel rods 16 arranged in an array with square unit cells in the transverse planes of the assembly, so that the rods 16 are arranged in successive mutually parallel rows, in horizontal arrangements, when the framework of the fuel assembly 8 is placed in the loading position.

Certain positions in the array of housings for the fuel rods 16 are occupied by guide tubes 17 allowing movement inside the assembly, during operation of the nuclear reactor, of absorber rods of clusters for controlling the reactivity of the core of the reactor.

The guide tubes 17, as indicated above, are fixed by welding on the spacer grids 18 of the framework for which they provide rigid assembly.

Preferably, the fuel rods of the assembly are loaded by successive horizontal rows, the means for gripping the fuel rods, driven by the carriage 14, consisting of a set of n parallel tie rods arranged in a horizontal plane row, in the same manner as the rods 16 of a horizontal row, in the case of an assembly with square cross-section including n×n rod housings.

As shown in FIG. 2, guide tubes 17 are interposed in certain horizontal rows of rods 16. During filling of the housings of the corresponding row, fuel rods must not be introduced into the framework of the assembly 8 in the positions occupied by the guide tubes 17.

The traction bench 4 includes, at one of its ends, a selection device making it possible to retain certain selected gripping devices during the movement of the carriage 14 in its first direction of movement.

In this manner, the loading of the fuel assembly can be carried out line by line, while taking account of the guide tubes 17 of the assembly.

Figure 3:
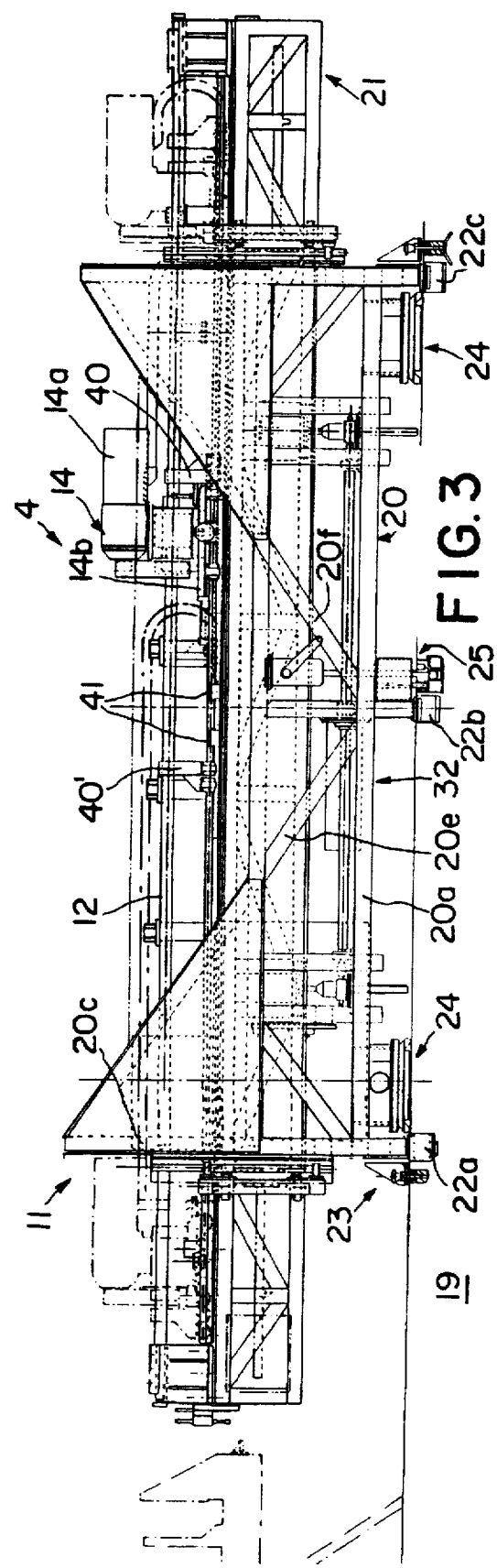
FIG. 3 is a view in elevation on a larger scale of the traction bench constituting a part of the installation shown in FIG. 1.

FIGS. 3 and 4 shown the loading unit 4 constructed in the form of a traction bench including a screw 12 placed in a longitudinal arrangement on the movable support 21 of the traction bench which is placed in alignment with the longitudinal axis 5 of the loading installation.

The support 11 includes a fixed part 20 provided with means 23 for fastening it on the floor 19 of the loading station and the support 21 which is movable in the vertical direction and which carries the screw 12 and the carriage 14 which can be moved step by step in the vertical direction in order to load successive rows of fuel rods into the framework of the assembly 8.

The carriage 14 makes it possible to move the longitudinal tie rods constituting a set of n tie rods, if n is the number of fuel rods in a horizontal line of the assembly.

The fixed support 20 is made rigid because it must withstand significant traction forces during the pulling of the rods. It includes horizontal longitudinal members such as 20a, 20b connected together by cross-pieces, and vertical uprights such as 20c, 20d at each of the longitudinal ends of the support 20. In addition, reinforcements such as 20e and 20f are arranged in inclined positions and connected to the longitudinal members and to the uprights.

The support 20 rests on the floor 19 of the loading line via six feet, such as 22a, 22b and 22c. The feet, such as 22a and 22b, located at the ends of the support 20 constitute the lower parts of the uprights such as 20c and 20d and include removable means for fastening in the loading floor such as 23, including a threaded rod which can be engaged in a tapped opening of an anchoring unit fixed in the floor 19 of the loading line.

The support 20 also includes four air-cushion pads 24 allowing the support 25 to be raised above the floor 19 when the threaded fastening rods of the devices 23 have been dismounted.

It is thus possible to move the entire support 20 above the floor 19, for example by using a device such as the movement device 25 which will be described hereinbelow, in order to move the traction bench 4 from a first position in alignment with a first loading line including a storage unit for new fuel rods and a framework support, to a second position in alignment with a second loading line which is parallel to the first.

It is thus possible to have available several fuel assembly loading lines served by a single traction bench.

The device 25 for moving the support 20 of the traction bench 4, shown in FIG. 6B, includes guide and drive means 25a arranged in a segment transverse to the loading lines, below the upper level of the floor 19. The means 25a include, in particular, a slideway and a transverse rack 26 and the support 20 carries a drive and guide assembly 25b including a pinion 27 meshing with the rack 26 and a guide roller 28 interacting with the slideway.

A crank 29 makes it possible to drive the pinion 27 in rotation manually in order to move the support 20 transversely when the support 20 and all of the elements of the traction bench 4 are raised above the ground level of the factory by feeding the air-cushion pads 24 with compressed air.

The movable support 21 of the traction bench 4 which consists of the longitudinal members, the cross-pieces, the vertical uprights and the inclined reinforcement elements, is in the form of a highly rigid lattice structure supporting the drive screw 12 of the carriage 14 and the longitudinal guide elements 13 of the carriage.

The movable support 21 which has a length greater than the support 20 is arranged between the vertical uprights such as 20c and 20d of the support 20 on which four vertical guide columns such as 30a and 30b are fixed, on which guide bearings 31 are engaged which are integral with the movable support 21, so as to ensure guidance of the support 21 inside the support 20, in the vertical direction.

The vertical movement of the movable support 21 in either direction is ensured by a lifting assembly 32 carried by the fixed chassis 20. The assembly 32 includes a motor 33 for driving two screw jacks 34 via a drive assembly including pulleys, transmission rods 35 and pinions.

The rods of the screw jacks 34 are connected to the chassis 21 which they move in the vertical direction.

It is possible to produce a step-by-step movement in the vertical direction with a well-defined amplitude corresponding to the vertical distance between two successive horizontal rows of fuel rod housings in an assembly framework.

It is thus possible, as will be described hereinbelow, to load a fuel assembly framework by successive horizontal rows of rods.

The screw 12 interacting with the nut 15 of the carriage 14 is fixed on each of the two end parts of the movable support 21, outside the fixed support 20, by means of a fastening assembly including a seat 36 and a cap 37 covering the end of the screw 12 and fixed by screws onto the seat 36.

The screw 12 is fixed and the motorized carriage 14 is driven by means of a ball nut 15 driven in rotation by the motor 14a of the carriage 14, as will be explained hereinbelow.

The longitudinal guide means 13 of the carriage 14 consist of two long bars of circular cross-section attached and fixed on the upper part of the movable support 21, substantially over its entire length and above its upper surface.

The carriage 14 includes a base 14b on which rest a casing, in which the nut 15 engaging with the screw 12 is rotationally mounted, the casing itself being used as a support for the motor 14a of the carriage 14.

The base 14b of the carriage carries bearings 38 engaged and slidingly mounted on the guide bars 13 of the carriage 14.

Two devices 40 and 40' for holding the screw 12 are arranged on either side of the carriage 14. Each of the devices 40 and 40' includes four bearings 39 similar to the bearings 38 of the base 14b of the carriage which are slidingly mounted on the guide bars 13 of the carriage 14.

Each of the devices 40 and 40' includes an upright traversed by an opening 40a constituting a bearing providing sliding mounting of the device 40 or 40' on the screw 12.

The holding devices 40 and 40' of the screw 12 can be driven in translation in the longitudinal direction of the screw 12 and of the guide bars 13 by the carriage 14.

The base 14b of the carriage 14 carries attachment means consisting of clicks returned by springs, so as to provide linkage between the carriage 14 and a device 40, when the carriage, during its movements, comes to bear on the latter.

When the carriage 14 moves in a direction such that the device 40 is at the rear of the carriage, the holding device 40 of the screw 12 which is connected by the linkage device to the carriage 14 is pulled thereby and accompanies the movement of the carriage.

Two stops 41 are arranged on the upper surface of the movable support 21, adjacent its mid-part.

When the carriage 14 (FIG. 6B) moves towards the first stop 41, i.e., from right to left as shown in FIG. 6C, the carriage 14 drives by traction the device 40 shown in the figure which is connected to the base 14b of the carriage 14 by the click returned by a spring.

When the carriage 14 reaches the level of the stop 41, the latter causes the click to rise against the action of the return spring and releases the linkage between the holding device 40 and the carriage 14.

With the carriage continuing to move from right to left, the holding device 40 remains in place slightly downstream of the stop 41, so as to hold the screw 12 at its mid-part.

Figure 6A:
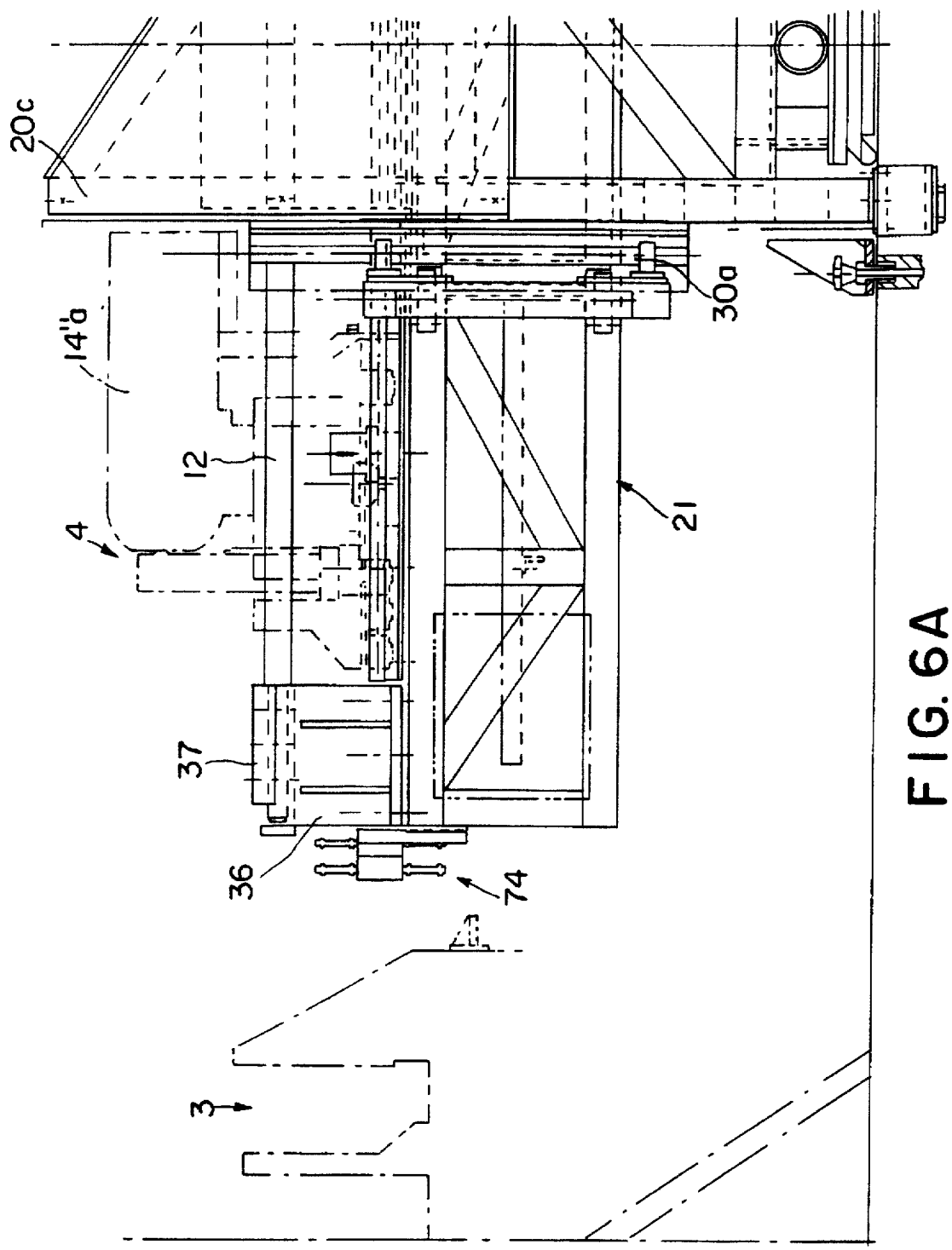

The carriage 14 then encounters the second holding device 40' shown in FIG. 6B. The carriage drives the device 40' by thrust, the click actuated by the second stop 41 having engaged on an attachment part of the holding device 40'. The carriage 14 can move as far as an extreme position 14"a shown in FIG. 6A, while being accompanied by a holding device 40' of the screw which is also held by a second holding device 40 remaining in fixed position in a position close to the mid-part of the screw 12. Efficient holding of the screw 12 is thus ensured in order to avoid it bending under the effect of its own weight, it being possible for this bending to be relatively significant because of the very great length of the screw 12 necessary to ensure movement of the carriage over a length ensuring gripping and positioning by traction of the fuel rods in the assembly framework which is being filled.

The holding device 40 or 40' which accompanies the carriage in its movements in either direction, and the second holding device 40 or 40' remaining in place in the vicinity of the mid-part of the screw 12 also make it possible to avoid vibration of the screw during the movements of the carriage.

As shown in FIG. 6C, the carriage 14 includes a motor 14a whose output shaft carries a pulley 42 mounted in the form of a toothed wheel on which a toothed belt 43 meshes, which belt engages with a second toothed wheel 44 which drives in rotation the ball nut 15 engaging with the screw 12.

The motor 14a of the carriage therefore makes it possible to rotate, by means of the toothed belt 43, the ball nut 15 which drives in translation the carriage 14 guided by the bearings 38 engaged on the longitudinal guide bars 13.

The use of a fixed screw and of a motorized carriage has substantial advantages compared to the use of a rotary screw, in particular in the case of a very long screw of a rod traction bench in which the amplitude of movement of the carriage and therefore the length exceeds four meters.

The carriage 14 moves the rod gripping devices over a sufficient length in the axial direction 5 of the loading line (see FIG. 1), either in the direction going from the traction bench 4 to the magazine 2, in order to grip new rods in the magazine, or in the reverse direction, in order to exert traction on the rods and place them in the framework of the assembly 8.

The first direction of movement of the carriage 14 corresponds to the direction of movement going from right to left in FIGS. 6A, 6B and. 6C, the carriage moving between a first extreme position 14'a (FIG. 6C) and a second extreme position 14"a (FIG. 6A), which respectively correspond to the position of attachment of the rod gripping devices and to the position of gripping of the rods by the gripping devices.

Figure 7A:
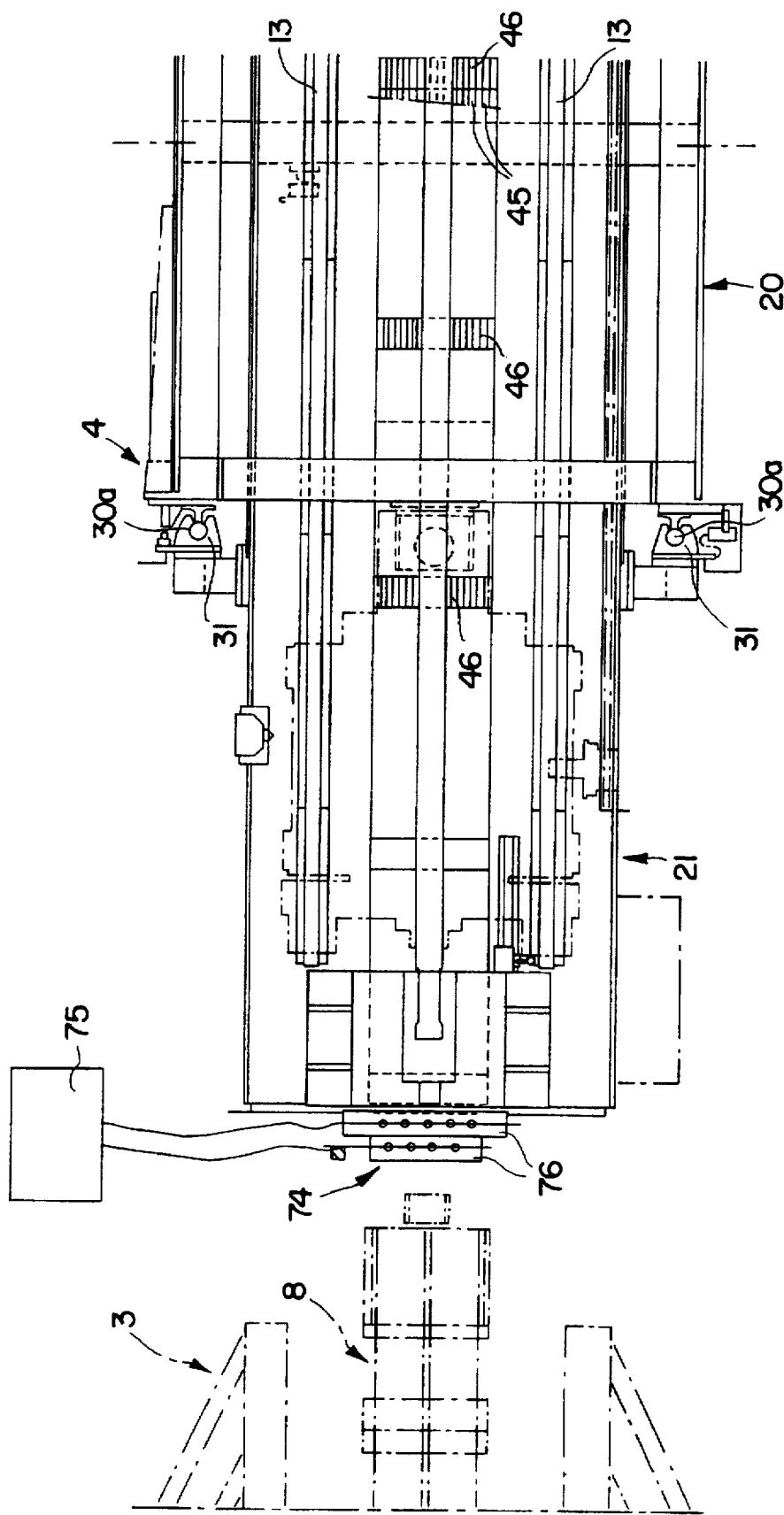
Figure 7B:
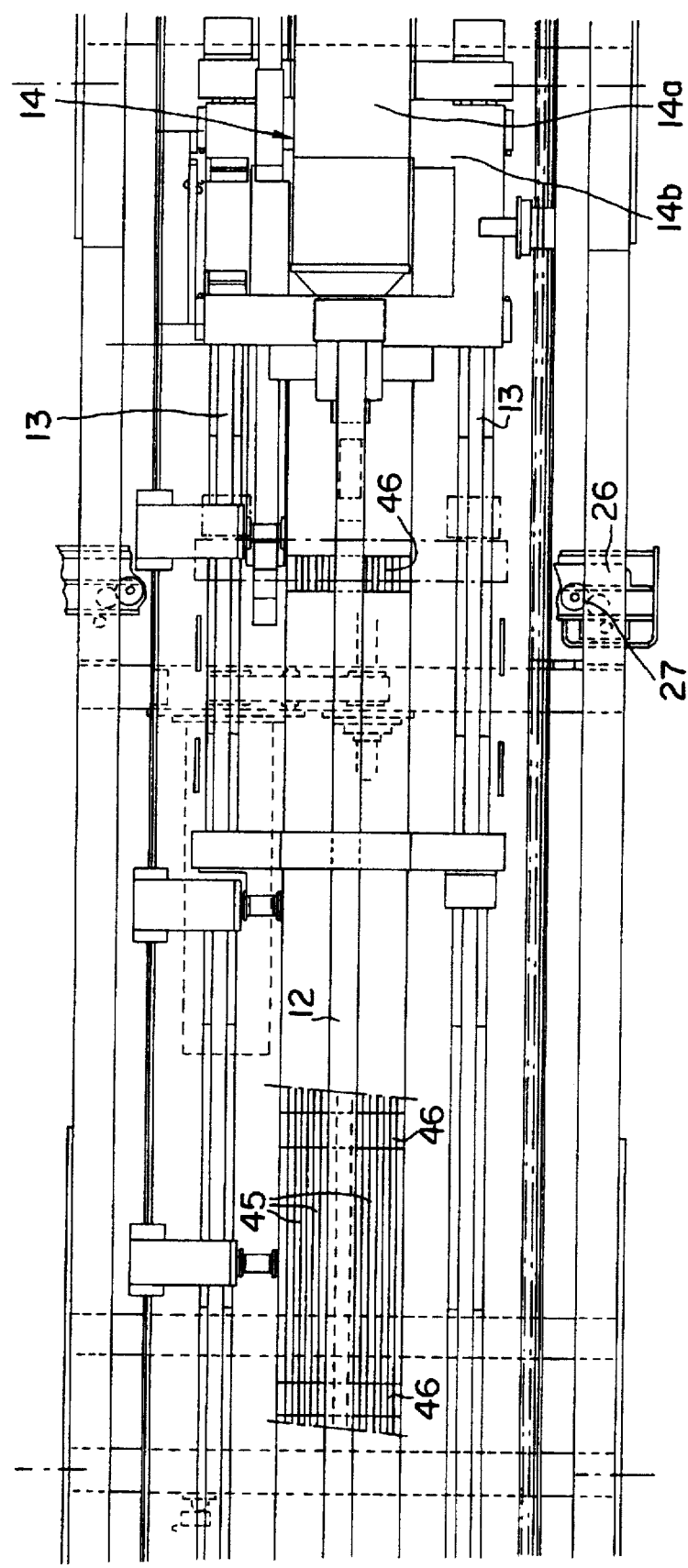
Figure 7C:
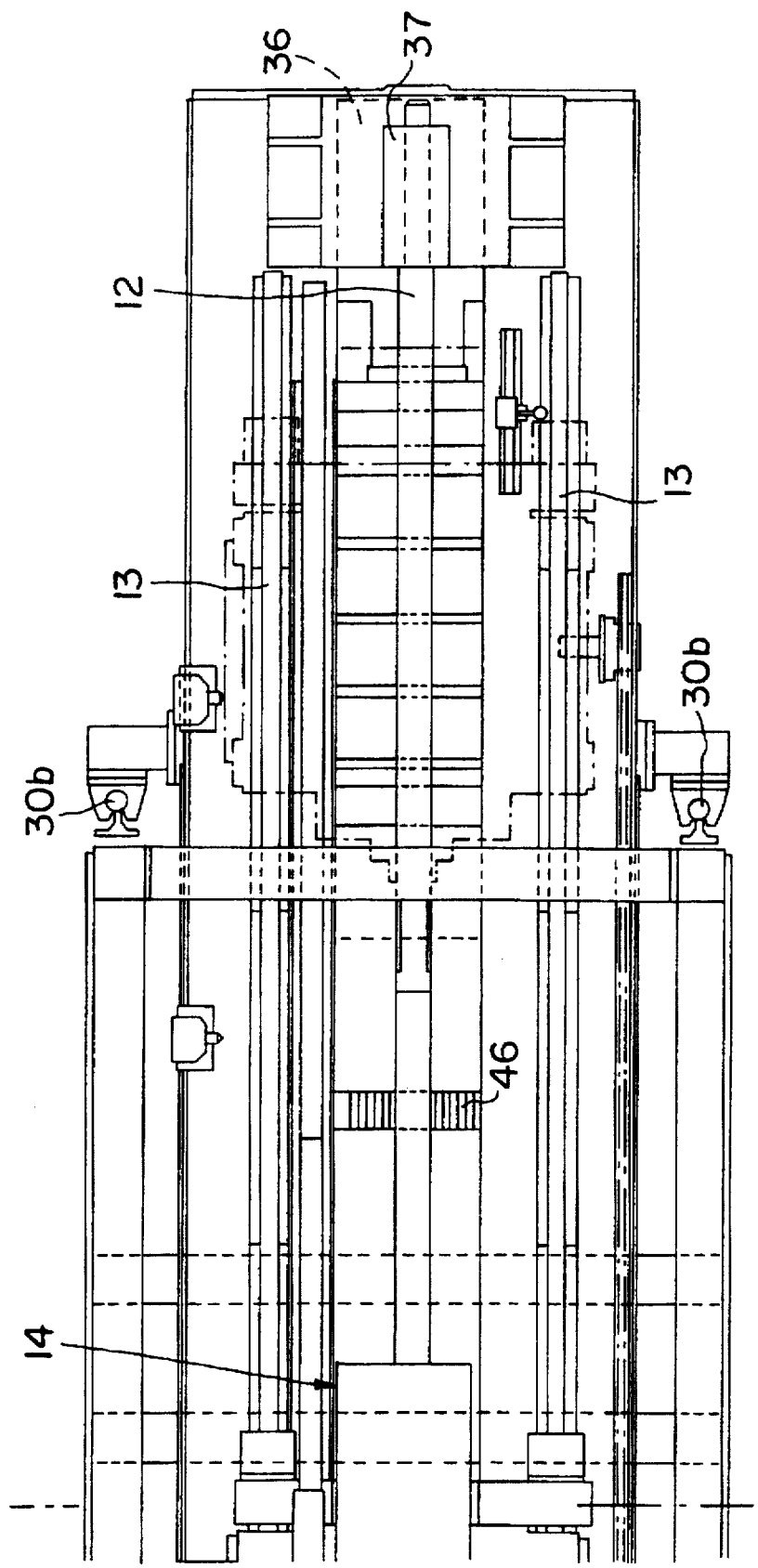

As can be seen in FIGS. 7A, 7B and 7C, the rod gripping devices consist of tie rods 45 which are shown in part and which have substantially the same length as the support 21, the structure of which will be described hereinbelow with reference to FIG. 10.

The tie rods 45 are placed side by side in an arrangement similar to that of the rods 16 in a horizontal row of rods, as shown in FIGS. 2 and 5, and their diameters are slightly less than those of the fuel rods intended to fill the framework of the assembly 8.

In the case of an assembly including n×n fuel rods, n being, for example, equal to 14, the horizontal rows of rods 16 include n rods, and use is made of a set of n parallel tie rods 45 which are guided on the upper surface of the support 21 by guide combs 46 distributed along the longitudinal direction of the support 21.

Figure 8:
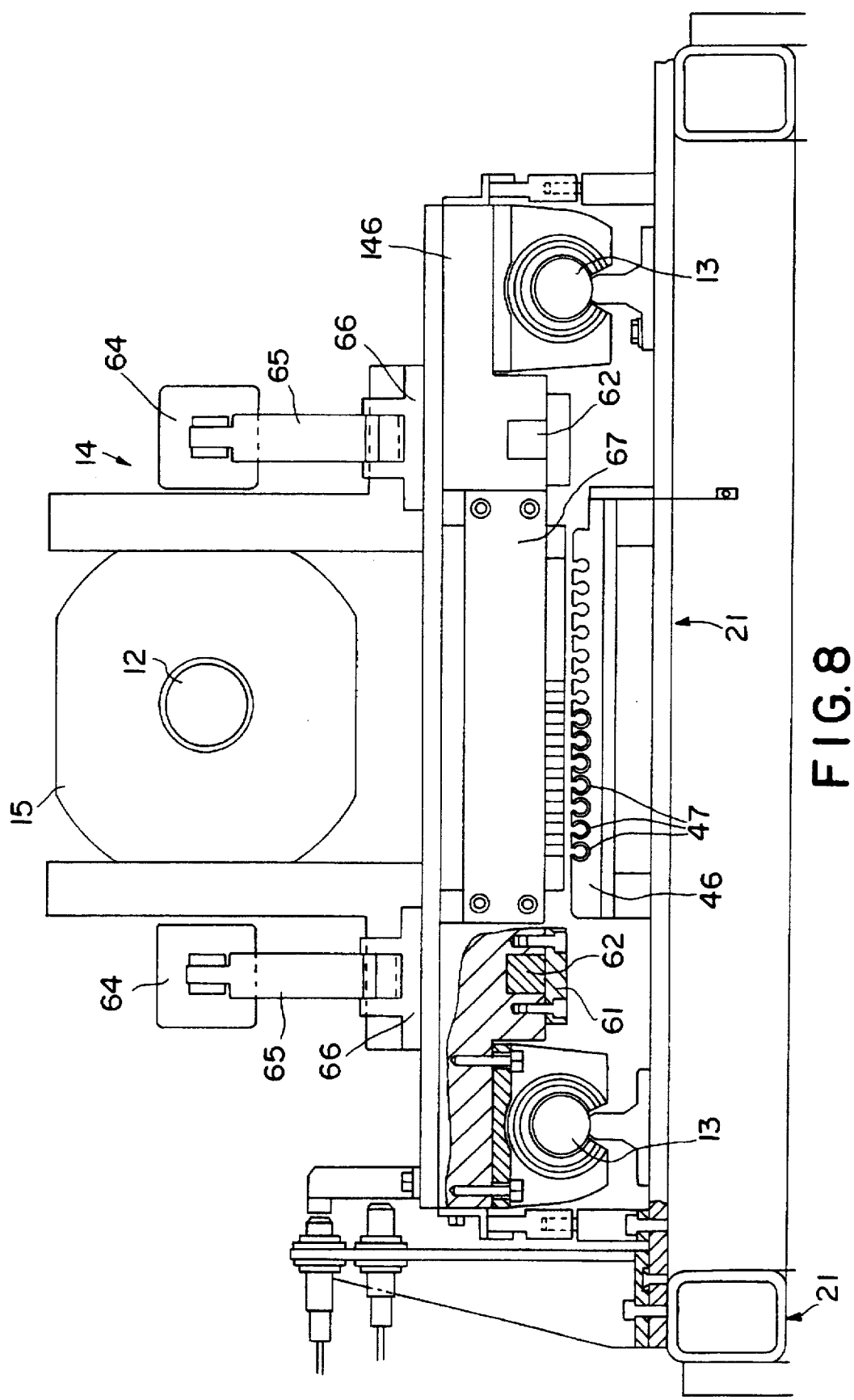
FIG. 8 is a view in elevation and in partial cross-section of the carriage of the traction bench.

FIG. 8 shows a guide comb 46 for a set of tie rods which includes fourteen circular housings 47 placed side by side in order to guide one tie rod each.

Each of the circular housings 47 is open at the top in order to allow passage of a cover element for fastening and driving the rod, as will be explained hereinbelow.

Figure 10:
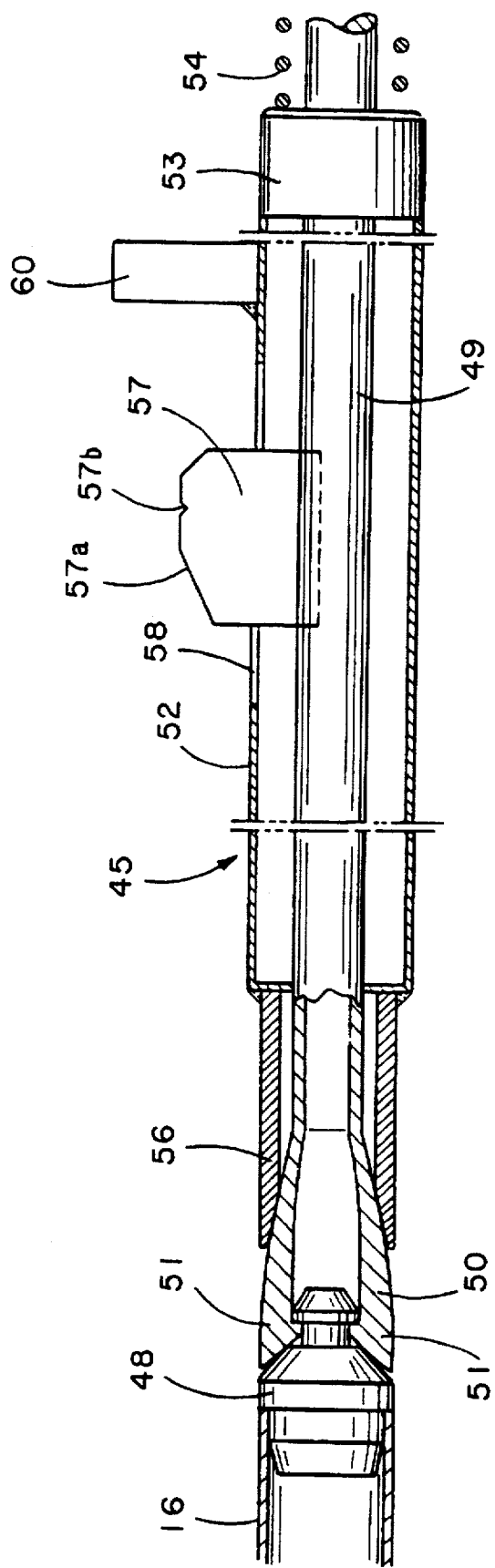
FIG. 10 is a side view, partly in section, of a tie rod for gripping a fuel rod.
Figure 13:
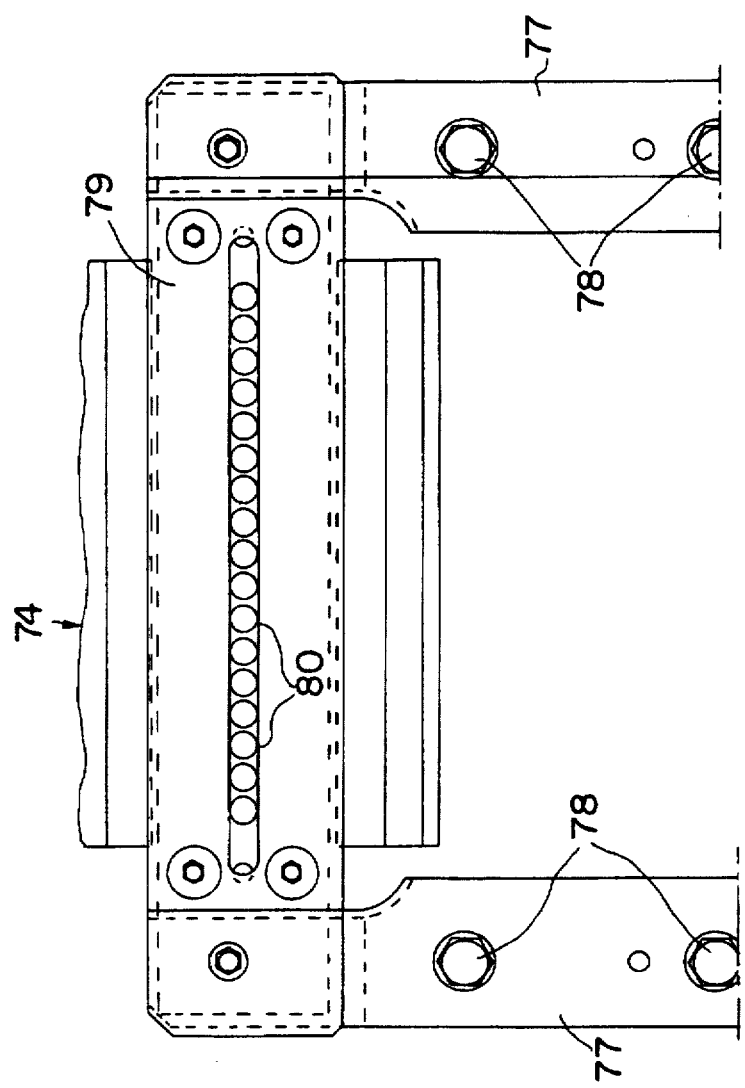
FIG. 13 is a front view in the direction of arrow 13 in FIG. 12.

FIG. 10 shows an attachment and traction tie rod in its position engaged on a plug 48 of a fuel rod 16 in order to load it into the framework of a fuel assembly.

Figure 9:
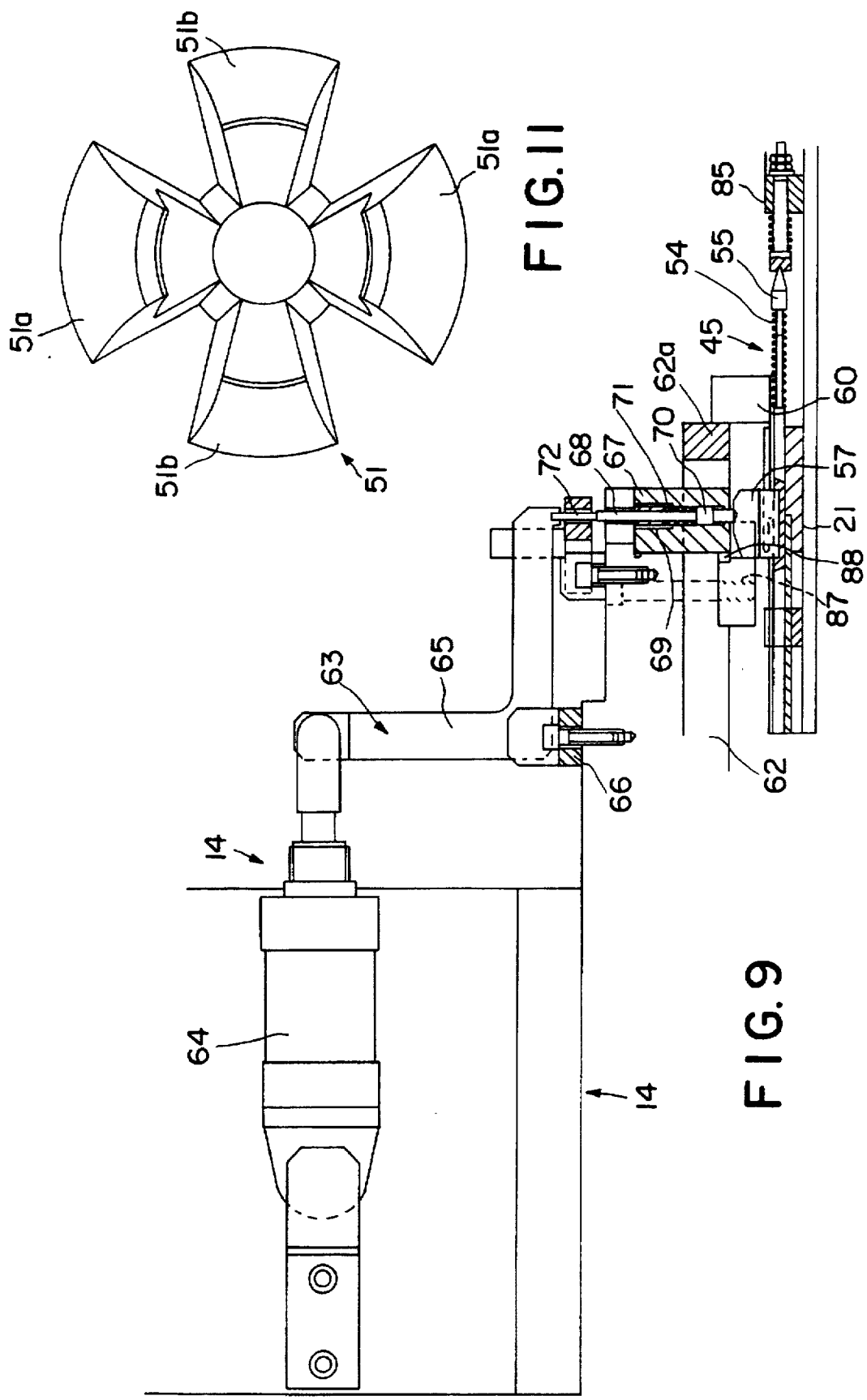
FIG. 9 is a view in side elevation showing means for linking a tie rod for gripping a fuel rod and the carriage.

FIG. 9 shows the means of attachment of a tie rod 45 under the carriage 14 in order to move it in the longitudinal direction of the support 21 of the traction bench 4.

As shown by FIG. 10, the tie rod 45 includes an inner part in the shape of a rod 49, and an outer part 52 in the form of a tubular sheath 52.

The inner rod 49 is solidly attached, at its front part, with a tubular part which is slit and machined to constitute an attachment clamp 51 for a plug 48 of a fuel rod 16.

An end adapter 55 (shown in FIG. 9) is fixed on the back part of the rod 49.

The rear end of the tubular outer part 52 of the tie rod 45 is solidly attached to an annular part 53 slidingly mounted on the rod 49.

A coil spring 54 is interposed between the annular part 53 solidly attached with the outer part 52 of the tie rod 45 and the end adapter 55 solidly attached to the inner rod 49.

The coil spring 54 returns the outer tubular part 52 toward the front part of the tie rod 45 including the clamp blades 51.

The tubular outer part 52 of the tie rod 45 is solidly attached at its front part with a clamping jaw 56 allowing the clamp blades 51 to be held in the closure position, when the tubular outer part 52 of the tie rod 45 is returned forward by the coil spring 54. The clamp blades 51 are then in the closure position, as shown in FIG. 10.

In this closure position, the clamp blades 51 can provide linkage of the tie rod 45 to the plug 48 of a rod 16.

The rod 49 constituting the inner part of the tie rod 45 is solidly attached with a plate 57 called a pull cover element which is fixed radially of the rod 49 and to the outer tubular sheath 52 of the tie rod 45.

The outer tubular sheath 52 includes a longitudinal slot 58 whose length exceeds the axial length of the pull cover element 57.

The pull cover element 57 is engaged in the slot 58 of the sheath 52 and has a profiled part projecting outside the sheath 52.

The profiled part of the pull cover element 57 projecting out of the sheath 52 includes, an inclined ramp 57a and a recess 57b allowing blocking of the cover element and of the rod 49 of the tie rod, as will be explained with reference to FIG. 9.

An operating plate 60 or opening cover element is also fixed radially and projecting from the outer surface of, the sheath 52 of the tie rod 45, in the vicinity of its rear part.

As shown in FIGS. 8 and 9, the under-base 14b of the carriage 14 carries, via slideways 61, an operating frame 62 which is mounted for movement on the carriage in the longitudinal direction of movement of the carriage, corresponding to the direction of the guide bars 13.

The frame 62 can be moved in the longitudinal direction by an operating jack (not shown) carried by the carriage 14.

The movable frame 62 of the carriage 14 includes a front cross-piece 62a, (FIG. 9) which can come to bear on the opening cover elements 60 of the outer tubular sheaths of the set of tie rods 45 arranged side by side along the length of the support 21 and held by the combs 46 including the housings 47.

The tie rods 45 are held by the combs 46 on the upper surface of the support 21, so that the opening cover elements 60 are directed vertically upwards, as shown in FIG. 9.

During the movements of the carriage and of the tie rods, the opening cover elements 60 can slide inside openings provided at the upper part of the housings 47 of the combs 46.

As shown in FIGS. 8 and 9, the carriage 14 carries an assembly 63 for blocking and attaching the tie rods.

The blocking and attachment assembly 63 includes two jacks 64 fixed on either side of the carriage 14, in the longitudinal direction on the outer side faces of the casing of the ball nut 15. The rods of the jacks 64 are each atriculated to the end of a branch of a bent lever 65 having two branches at 90° and mounted for pivoting movement about a horizontal axis on the carriage 14, by means of bearings 66.

A guide unit 67 for a set of rods 68 for attaching the tie rods 45 is mounted on the sub-base 14b of the carriage 14.

Each of the rods 68 is mounted for sliding movement inside a sleeve 69 inserted into a vertical opening traversing the guide unit 67.

Each of the rods 68 includes a diametrically widened lower part 70 whose end is hemispherical.

A coil spring 71 interposed between the sleeve 69 and the widened part 70 of the rod 68 makes it possible to return the rod 68 downward towards a tie rod 45, in order to attach the latter.

When the carriage 14 is moved towards the back end of the tie rods 45 arranged side by side on the support 21 of the traction bench, the lower end 70 of each of the rods 68 returned downward comes into contact with the inclined ramp 57a of a pull cover element 57 which pushes the rod 68 back upward while compressing the spring 71.

When the spherical end of the part 70 of the rod 68 reaches as far as the cavity 57b of the cover element 57 of the tie rod 45, the spring 71 returns the rod 68 downward and introduces the hemispherical end of the part 70 of the rod into the cavity 57b of the pull cover element 57. This ensures linkage between the carriage 14 and the tie rod 45.

When the carriage is brought to move forward, i.e., toward the framework support and the fuel rod magazine, the tie rods 45 are driven by the carriage toward the framework support.

The branch of the bent lever 65 which is not connected to the operating rods of the jacks 64 carries a set of blocking studs 72 which are engaged in a part of the guide unit 67, each in axial alignment with an attachment rod 68 of a tie rod 45.

When the jacks 64 are actuated so that their rods come into an emergent position, the bent lever 65 pivots and presses the blocking studs 72 against the end of the attachment rods 68 of the tie rods. The rods 68 are then totally blocked and can no longer move inside the sleeve 69. This produces blocking of the rod 49 of the jacks constituting the inner part of these jacks.

In contrast, the tubular outer sheaths 52 of the tie rods 45 can be moved axially with respect to the rods 49 by exerting a thrust on the opening cover elements 60 via the sliding frame 62 of the carriage 14.

By actuating the movement jack of the frame 62 so as to move the frame backward, a thrust is exerted on the opening cover elements 60 and the outer tubular sheath 52 of the tie rods 45 which moves backwards while compressing the springs 54.

The clamping jaws 56 of the clamp blades are moved backwards and release the blades 51 which move apart because of their elasticity. This opens the clamp.

Each of the clamps can then be engaged on the attachment part of a plug 48 of a fuel rod by moving the corresponding tie rod in the axial direction.

The clamps are closed by moving the frame 62 in the direction opppsite to the preceding direction, i.e., toward the front of the tie rods. The outer sheath 52 and the jaw 56 of the tie rod 45 are then returned forward by the spring 54. This closes the clamp blades on a plug 48, as shown in FIG. 10.

It is then possible to release the pressure of the jacks 64, so as to free the attachment rods 68 of the tie rods which are returned backward by the springs 71 and whose end part is held in the attachment recesses 57b of the pull cover elements 57.

By moving the carriage 14, it is thus possible to move the tie rods 45 in the longitudinal direction.

As shown in FIG. 11, the blades of the attachment clamps 51 of the tie rods 45 constituting the end part of the inner rods 49 comprise two pairs of blades 51a and 51b, respective placed in opposite positions with respect to the axis of the tie rod, the blades 51 of the pair 51a being wider than the blades of the pair 51b.

The blades 51b have no attachment tip but simply an inclined inner surface allowing the clamp to be guided over the frustoconical end part of the plug 48 of a fuel rod 16, during a small-amplitude movement of the tie rod 45 in order to position the blades 51. The blades of the pair 51a include attachment tips which come, at the end of positioning of the clamp, opposite the attachment groove of the plug 48.

Freeing the outer sheath 52 of the tie rods by operating the jacks 64 causes return of this sheath and of the clamping jaw 56 onto the blades 51, the tips of the pair of blades 51a coming to engage in the groove of the plug 48.

As shown in particular in FIGS. 6A, 7A, 12 and 13, a unit 74 for selecting the tie rods 45 is fixed to the front part of the support 21, i.e., the part of the support 21 which lies opposite the framework support 3 of the fuel assembly loading line.

The selection block 74, which includes two lines of jacks 76, is connected to an electropneumatic programming unit 75 shown in FIG. 7A which makes it possible selectively to supply the jacks of the lines of jacks 76 of the unit 74 in order to select the tie rods 45 used during an operation of loading a row of fuel rods into the framework of the assembly 8.

In fact, as was explained with reference to FIG. 2, the horizontal rows of rods to be introduced into the assembly may be incomplete because of the presence of guide tubes interposed in certain horizontal lines of rods. The program for filling the fuel assembly is stored in a progamming unit of the electrohydraulic unit 75, in order to select, for each of the tie rod 45 movement operations, as will be explained hereinbelow, the tie rods used for positioning the fuel rods by traction.

The selection unit 74 includes fastening tabs 77 which allow the body 79 of the selection unit 74 to be fastened by screws 78 onto the front end of the support 21.

The body 79 of the selection unit 74 is traversed by parallel channels 80 arranged side by side and having a diameter greater than the outer diameter of a tie rod 45 and of a fuel rod 16 for filling the fuel assembly 8.

The channels 80 are arranged so that their axes are in exact alignment with the axes of the tie rods 45 resting on the supports 21 and guided by the combs 46.

In the case of a fuel assembly including n×n fuel rods, the unit 79 is traversed by n through channels 80.

An opening 81 whose axis is perpendicular to the axis of the channel 80 emerges in each of the channels 80.

The openings 81 constitute two sets of aligned openings passing respectively through each of the two parts 76 of the selection unit 74.

Two lines of jacks 82 are arranged on the upper face of the body 79 of the unit 74, so that the actuation axis of these jacks lies in alignment with the axes of openings 81.

Two series of aligned jacks are arranged under the lower face of the body 79 of the unit 74, in alignment with the openings 81 of the two lines of openings.

Each of the openings 81 is assigned one jack 82 whose rod is aligned with the axis of the opening 81.

The arrangement of the jacks in two lines above and below the unit 74 makes it possible to position the jacks in spite of their bulk, in view of the small spacing of the channels 80 and of the openings 81.

A blocking stud 83 is fixed on each of the rods of the jacks 82; the diameter of this stud is slightly less than the diameter of the openings 81.

Figure 12:
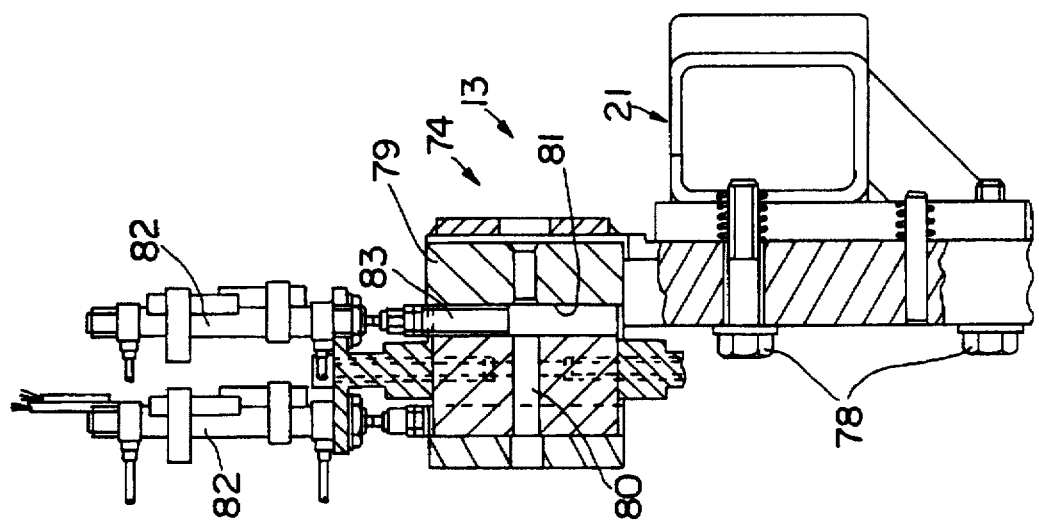
FIG. 12 is a view in elevation and in section through a vertical plane of the device for selecting the gripping tie rods of the traction bench.

The blocking stud 83 fixed at the end of the jack rod 82 is slidingly mounted in the opening 81 so that the jack can move the stud 83 between a corresponding open position of the channel 80 (as shown in FIG. 12) and a closed position of the channel 80, in which the blocking stud 83 extends through the channel 80.

When a tie rod 45 driven by the carriage 14 in its first direction of movement reaches the level of a channel 80 of the selection unit 74, the front part of the tie rod 45 consisting of the clamp blades 51 can pass through the channel 80 if it is open.

The tie rod 45 can then be introduced by continuous movement of the carriage into the framework of the fuel assembly 8 resting on the framework support 3. The tie rods penetrate into the housings of a horizontal line of rods which are aligned with the tie rods 45.

When the front end of a tie rod 45 penetrates into a channel 80 closed by a blocking stud 83, this front part comes to abut against the stud 83, which stops the longitudinal movement of the tie rod 45. The carriage 14 continues its forward movement, that end part 70 of the holding rod 68 of the tie rod 45 which is returned by the spring 71 being lifted so as to leave the cavity 57a of the cover element 57 of the tie rod 45 and release the tie rod 45. The tie rod 45 which corresponds to a position in the row of tubes occupied by a guide tube remains in place and is not driven towards the framework support.

It is therefore possible to select, on each of the movements of the carriage driving the tie rods, the subset of tie rods 45 necessary to fill the line of housings, taking into account the position of the guide tubes.

It should be noted that the carriage stops at the moment when the front end of the tie rods reaches the front end of the traction bench, opposite the framework support, so as to place protective caps on the front part of the tie rods consisting of the clamps 51. The protective caps of the tie rods make it possible, during the subsequent movement of the tie rods inside the framework of the assembly, to move apart the springs in each of the cells of the spacer grids defining the corresponding housing.

The automatic device forming the subject of Application FR-A-92-05231 may be used for fitting the caps.

After covering of the front ends of the tie rods 45 with caps, the carriage 14 is restarted and continues its forward movement while driving the tie rods 45.

In the event of accidental blockage of a tie rod inside a fuel assembly framework housing, the end part 70 of the rod 68 for driving the tie rod can rise so as to free the linkage between the carriage and the accidentally blocked tie rod. This prevents any risk of damage to the tie rods and to the spacer grids of the fuel assembly.

The forward movement of the carriage 14 is continued until the moment when the front parts of the selected tie rods 45, consisting of the clamp blades 51, pass beyond that end of the framework of the fuel assembly which is opposite the entry end facing the traction bench 4.

The front parts of the tie rods covered by the caps are then in proximity and facing the plugs 48 of the fuel rods 16 arranged in a line of the fuel rod storage magazine 7 from which the assembly framework is loaded. The carriage is then stopped, the caps are removed from the tie rods and the inner parts of the tie rods 45 are blocked by means of the pull cover elements 57, by operating the blocking jacks 64.

The clamps are then opened by maneuvering the frame 62 bearing on the cover elements 60 solidly attached to the outer sheath 52 of the tie rods 45.

The tubular sheath 52 of each of the tie rods 45 is moved backward, so that the jaw 56 releases the clamp blades 51, which can then be placed in open position, by virtue of their elasticity.

The relative movement of the tubular sheath 52 with respect to the inner rod 49 of the tie rod 45 is made possible because the slot 58 is substantially longer than the pull rod 57 in the longitudinal direction of the tie rod.

The carriage is then moved forward, and drives the set of selected tie rods, the clamps of which have been placed in the open position.

As explained hereinabove, the clamps 51 of the tie rods 45 come to engage on the plugs 48 of the rods 16 selected in the line of rods of the magazine.

The frame 62 slidingly mounted on the carriage 14 is then moved in the forward direction toward the front part of the tie rods 45.

The springs 54 of the tie rods 45 elastically return the tubular sheaths 52 toward the front of the tie rods, so that the jaws 56 tighten the clamps 51 of the tie rods 45 onto the plugs 48 of the fuel rods 16.

The jacks 64 are operated so as to release the rods 68, so that the tie rods are connected to the carriage 14 via rods 68 whose end part 70 is returned by the springs 71 into the recesses of the cover elements 57 of the corresponding tie rods.

The carriage is then moved backward, i.e., in the direction opposite to the framework support 3, in the fuel assembly loading line.

The tie rods 45 move inside housings of the framework and introduce the fuel rods 16 into the framework housings by traction.

In the event of blockage of a tie rod, at the level of a spacer grid of the framework, the linkage between the carriage and the tie rod can be interrupted by escape of the end part 70 of the linkage rod 68 between the carriage 14 and the tie rod 45.

In the case of pulling of the rods, the forces are transmitted to the pull cover elements 57 by a thrust bar 87 integral with the carriage 14. A force sensor or pressure sensor 88 is interposed between the bar 87 and each of the pull cover elements 57. During pulling of the rods, if a rod blocks in the framework of the assembly, the corresponding sensor records a force which exceeds a predetermined limit. The operation of pulling the rods is then interrupted by stopping the carriage 14.

All the fuel rods of a horizontal row of rods of the assembly can therefore be fitted simultaneously inside the framework without risk of damage because of the fitting by traction with perfect guidance and antiblock safety precautions.

When the carriage has reached a position which has been predetermined as a function of the length of the rods to be placed in the framework, the movement of the carriage is stopped, the clamps are loosened and the tie rods and the fuel rods are separated.

The tie rods can be returned to their extreme position at the rear of the chassis 21, in which the endpiece 55 of the tie rod comes to bear on an elastic stop 85, as shown in FIG. 9.

Video cameras such as 89 and 90 (FIG. 1) make it possible to remote control the passage of the tie rods and the attachment and the passage of the fuel rods on either side of the tilting bench 3.

As shown in particular in FIG. 6C, the sub-base 14b of the carriage 14 carries a detector 86 in the form of a feeler whose rod is capable of coming into contact with stops arranged in perfectly determined positions along the length of the support 21, during the movement of the carriage, depending on the type of fuel assembly to be loaded.

The stops are placed so that the detector 86 sends a signal to a control unit of the motor 14a of the carriage in order to regulate the speed of movement of the carriage 14, following the phases of movement of the carriage either forward or backward.

In fact, some high-amplitude movements can be carried out at high speed, while some other movements, for example positioning of the clamps on the end plugs of the rods, are carried out at lower speed.

After a horizontal row of fuel rods has been loaded, the movable support 21 of the traction bench is moved vertically either downward or upward in order to pass from one row loading position to another.

For example, it is possible to load successive rows of rods into lines of housings of the framework which may be at a variable distance from each other on either side of the mid-line of the assembly.

All these successive loading operations can be managed by a programmable robot.

After the movable support of the traction bench has been placed at the desired level, the described operations necessary for loading a row of fuel rods are recommenced. The programming unit of the control device of the selection unit makes it possible to take into account the construction of the new row of rods to be fitted into the framework.

When the filling of the fuel assembly framework 8 has been completed, after the end nozzles have been remounted, the framework support is tilted into the vertical position, in order to remove the fuel assembly which has just been filled.

When several parrallel loading lines are provided, each including a framework support and at least one storage magazine for new rods, after one fuel assembly has been filled, it is possible to move the traction bench sideways towards a new loading line, while the operations of removing the assembly on the first loading line are carried out.

This prevents any time loss during fuel assembly loading operations.

The magazine support 6 can support several magazines 7 containing new rods and means for replacing an empty magazine with a magazine full of new rods, during the loading operation of a fuel assembly.

The installation for loading fuel assemblies according to the invention makes it possible very rapidly to fill the frameworks of assemblies with fuel rods, without risk of damage to the rods and to the frameworks. Furthermore, almost all of the operations carried out by the loading installation can be carried out without manual intervention.

The tie rods and the fuel rods are moved regularly and without vibration, because the fixed screw on which the nut of the motorized carriage is engaged is continuously held efficiently by holding devices associated with the carriage and fitted at the central part of the screw. It is thus possible to use very long screws which allow high-amplitude movements of the tie rods and of the rods without risk of bending and vibration of the screws.

One of the important advantages of the invention is that the loading installation can be changed very rapidly from an operation of loading a first type of assemblies to an operation of loading a different type of assemblies, for example, one having a different number of fuel rods.

In fact, the traction bench can easily be adapted by replacing the guide combs fixed on the movable support 21 with suitable guide combs, by providing a number of tie rods equal to the maximum number of fuel rods in a line of the framework of the assembly and by fixing a selection unit at the front of the traction bench including a desired number of channels and connected to a control unit which is programmed as a function of the structure of the assembly.

A loading unit or traction bench which includes a type of support different from the support described hereinabove and a carriage associated with movement means which are also different can be used.

Similarly, the means for gripping the rods may be different from the tie rods with coaxial structure which have been described hereinabove.

The means for linking the tie rods and the carriage may also be made in a different manner.

The selection unit for the tie rods may have any form suitable for stopping the tie rods in their forward movement.

It is possible to load the assembly in successive vertical rows instead of horizontal rows. It is also possible to load the rods in groups of rods other than a row.

All these operations are managed by a programmable robot.

The installation according to the invention can be used for loading any type of fuel assemblies including mutually parallel rods which are arranged in an array.

We claim:

1. An installation for loading a fuel assembly consisting of a framework for making housings for a set of fuel rods in parallel arrangements and in an array and including guide tubes which substitute for certain rods in the array, said installation including:

(a) at least one loading line comprising a framework support and a magazine for storing fuel rods in an arrangement aligned along the longitudinal direction of the housings of the framework; and (b) a loading unit comprising:

(i) a support to be positioned in the loading line, in longitudinal alignment with the framework support and the storage magazine;

(ii) a screw fixedly mounted in the longitudinal direction on the support;

(iii) a carriage mounted for movement on the support in the longitudinal direction, including a motor for driving a nut rotationally mounted on the carriage and engaging with the screw;

(iv) two screw holding devices placed on either side of the carriage and including guide bearings engaged on means for guiding the carriage and removable means of attachment to the carriage and stops fixed on the support on the path of the carriage for actuating the attachment means of the screws holding devices;

(v) a plurality of rod gripping means;

(vi) means for linking the rod gripping means and the carriage;

(vii) a plurality of means controlled selectively in order to interact with each of the rod gripping means to allow displacement of the gripping means by the carriage or retention of the gripping means;

(viii) a selection unit for selective activation of a subset of means interacting with the gripping means; and (ix) means for controlling the rod gripping means.

2. The installation according to claim 1, wherein the support includes a first fixed part fitted with means for fastening said first part onto a floor of the loading line and a second movable part mounted for vertical movement on the first fixed part and associated with a device for moving the second movable part with respect to the first fixed part in steps on predetermined amplitude.

3. The installation according to claim 2, wherein the means for moving the second movable part of the support includes a drive motor, at least two screw jacks and at least tow rods linking the motor and the screw jacks.

4. The installation according to claim 2, wherein the first fixed part of the support includes support means consisting of air-cushion pads and means for moving the support above the floor of the loading line, in a transverse direction perpendicular to the longitudinal direction.

5. The installation according to claim 4, wherein the means for moving the support in a transverse direction includes a guide rail and a rack which are fixed in a transverse direction in the floor of the loading line, a pinion meshing with the rack, a roller interacting with the transverse rail and means including a crank for driving the pinion in rotation.

6. The installation according to claim 2, wherein the first part and the second movable part of the support are in the form of a rigid elongate chassis including longitudinal members, uprights, cross-pieces and inclined reinforcement elements.

7. The installation according to claim 1, wherein the guide bars of longitudinal direction are mounted on the support and the carriage carries guide bearings engaged on the guide bars.

8. The installation according to claim 1, wherein the rod gripping means consist of elongate tie rods including an inner part consisting of a rod carrying, at its end, at least two gripping blades for gripping a fuel rod and an outer part in the form of a tubular sheath mounted coaxially around the rod and including, at one of its ends, a jaw for clamping the blades and a spring for returning the tubular sheath in the axial direction of the rod, so as to place the jaw in position for clamping the blades.

9. The installation according to claim 8, including an actuation part fixed on the tubular sheath of each of the tie rods projecting with respect to its outer surface and an element mounted for sliding movement on the carriage and associated with a means for movement in the longitudinal direction for moving the tubular sheaths of the tie rods in the longitudinal direction, against the action of the spring, in the direction of untightening the clamps by thrust of the sliding element against the element integral with the tubular sheath.

10. The installation according to claim 8, wherein the linkage means of the tie rods passing though the sheath at the level of a longitudinal slot and of the carriage include, fixed on the inner rod of each of the tie rods, a plate or cover element of radial direction with respect to the tie rods having a part projecting outside the sheath in which a cavity is machined, and a set of rods mounted for sliding movement in openings of a part of the carriage, in line with the tie rods resting on the support, each of the rods including an end part returned by a spring so as to come to be housed in the cavity of the linking plate or cover element of the corresponding tie rod.

11. The installation according to claim 10, furthermore including a lever carrying means for blocking the sliding rods, which lever is associated with at least one operating jack for blocking the rods of the tie rods with respect to the outer tubular sheaths by control of the jacks.

12. The installation according to claim 8, wherein the blades of the clamps for gripping each of the tie rods have the shape of coaxial cylindrical sectors and include two attachment blades comprising an attachment tip and two guide blades of smaller circumferential dimension than the attachment blades.

13. The installation according to claim 8, including a selection unit arranged at an end of the support which lies opposite the framework support and including a body traversed, in axial alignment of each of the tie rods resting on the support, by a channel having an opening transverse with respect to the channel, a blocking stud integral with the rod of a jack being mounted for sling movement in said opening to move said blocking stud between a position which leaves the channel open and a position of closure of the channel and blocking of a tie rod.

14. The installation according to claim 13, wherein the jacks for moving the blocking studs of the selection unit are connected to an electro-hydraulic control unit including programming means for selective activation of a subset of jacks.

15. The installation according to claim 1, wherein the carriage includes a thrust bar on the linkage means of the gripping means, and a force sensor interposed between the thrust bar and each of the linkage means.

16. The installation according claim 1, including at least one video camera for monitoring movement of the gripping means and the fuel rods on either side of the framework support.

* * * * *